Figure 1:
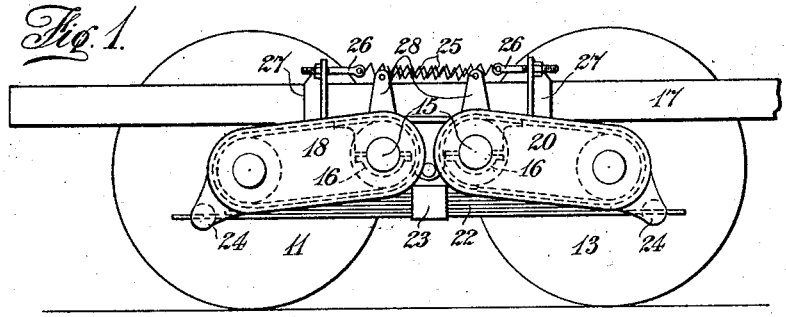

June 9, 1931.  F. S. FARNSWORTH  1,809,196
DRIVING AND SPRING SUSPENSION OF VEHICLES
Filed Oct. 2, 1928

INVENTOR
F. S. FARNSWORTH
BY
ATTORNEYS

Patented June 9, 1931

1,809,196

UNITED STATES PATENT OFFICE

FRANK SMEDLEY FARNSWORTH, OF DERBY COUNTY, ENGLAND

DRIVING AND SPRING SUSPENSION OF VEHICLES

Application filed October 2, 1928, Serial No. 309,807, and in Great Britain October 8, 1927.

My invention relates to the driving and spring suspension of vehicles.

The main object of the invention is to improve the spring suspension and drive of vehicles having front steering wheels and two, four, six or more driving wheels, a similar method of suspension preferably being employed as described in the specification of my prior Patent No. 211,999, although it is not restricted to such suspension, the latter suspension when employed being amplified and adapted to suit all conditions of drive and to the number of driving wheels of the vehicles.

Another object of my invention is to provide an improved spring suspension which will allow the wheels mounted on the ends of axles to move vertically or approximately vertically without seriously disturbing the level of the axles or whereby, in other words, the axles will retain the horizontal position when either wheel moves vertically in passing over an obstacle. To obtain this result it follows that each wheel must be sprung separately, and that the flexion of any one spring or set of springs governing the action of one wheel must not be communicated to the springing arrangements of the other wheel or wheels. This result is of course impossible with the ordinary solid type of axle.

A result obtained from the use of my improved suspension is the cancelling of the effect of "unsprung weight". By the usual methods of vehicle suspension the springs are mounted direct onto the axles, and the chassis or framework carrying the engine and transmission gear (in a motor car) and bodywork is in turn secured to the springs. By this construction any part of the vehicle mounted beneath the springs is totally "unsprung" except for the cushioning effect derived from the tyres. By the use of the improved suspension all unsprung weight is eliminated. Also, the springs are relieved of all side and driving stresses, their sole duty being to absorb shocks and vibration.

According to the present invention in a vehicle having four driving road wheels said wheels are mounted on separate stub axles disposed on separate triangular crank arms or similarly shaped members, are in some cases, rotated by chains, belts or other intermediate gearing carried by, or disposed adjacent to, said triangular crank arms or members are each independently movable relatively to another and companion wheel and against the action of load-carrying springs, spring buffers or like devices having a portion thereof rigid with, or anchored to, the chassis or body of the vehicle and are, in some forms, also movable against the action or rebound or reaction springs, spring buffers or like devices attached to the triangular crank arms or members and to said chassis or body.

The invention will now be described with reference to the accompanying drawings, in which:—

Figure 2:
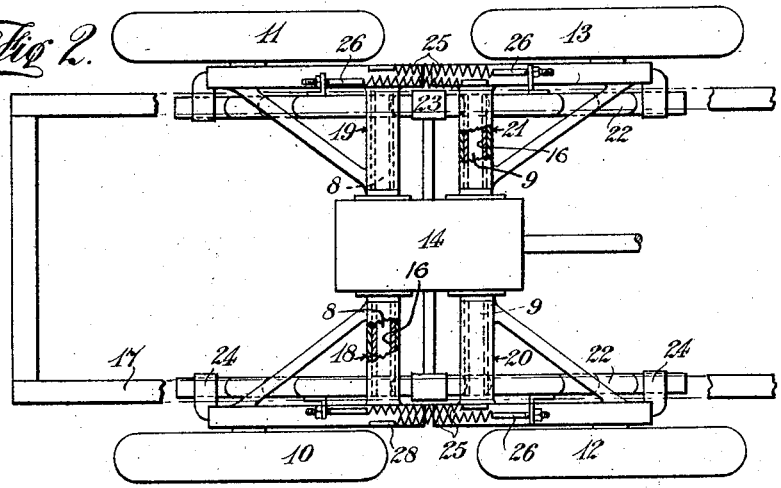
Figure 3:
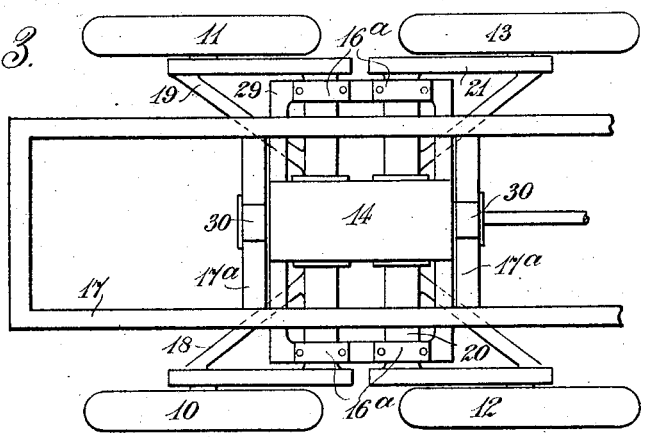

Figure 1 is a partly side elevation, with the two near side road wheels removed, of a suitable manner of applying the invention to a vehicle having four rear driving wheels, Figure 2 is a plan view of Figure 1 with the chassis and other parts broken away, Figure 3 is a modification of the construction illustrated in Figures 1 and 2.

Thus, according to the invention and as partly illustrated in the drawings, the vehicle has two front steering road wheels, not shown, and two rear driving axles 8 and 9, each driving axle carrying two driving road wheels 10, 11, 12 and 13 as this application will be typical of all types.

The two driving axles 8 and 9 are brought as closely together in the same plane as is convenient and the driving mechanisms of each axle, which may preferably be of the overhead worm type, are combined in one central gear box or rear axle casing 14 which is carried by tube extensions 15 supported in bearings 16 attached to the main chassis framing 17, a separate tube extension being provided for each driving shaft. The tube extensions 15 carry elongated sleeves 18, 19, 20 and 21 adapted to turn about said tube extensions 15 and in bearings 16, which sleeves have the same type of members or triangular formation or crank arms and the same method of drive to the road wheels 10, 11, 12 and 13, the triangular members projecting forwardly or backwardly of their driving shafts in order to carry their respective wheels. It must be understood, however, that rectangular or other shaped members may be used in place of the triangular members if desired. Springs of any known type or system may be used, but when employing laminated strip or plate load-carrying springs, the half elliptic type may be used as at 22, the springs being pivotally mounted at 23 at their centres between the bearings 16 carrying the sleeves and axles, the outer ends of the triangular members 18, 19, 20 and 21 carrying the road wheels 10, 11, 12 and 13 bearing upon the ends of the springs which slide between rollers or pivoted blocks 24, one spring only being required on each side of the vehicle as shown.

Each driving road wheel illustrated in Figures 1 and 2 may be provided with a rebound or reaction spring 25, which may be of the helical type, mounted horizontally in tension, such as by a screw-threaded bolt 26, and attached both to the chassis framing by means of a bracket 27 and to an arm 28 integral with, or secured to, a triangular member. This spring 25 is provided with a wide range of adjustment and serves to balance the weights of the road wheel and the triangular member carrying same. The unsprung weight is reduced but not eliminated when the reaction springs are omitted. In the case when the rebound or reaction springs 25 are fitted to the vehicle the centres of the laminated springs 22 are preferably rigidly or immovably mounted between the bearings 16. This design is most suitable for ordinary road traffic in which it is unnecessary to pivot the laminated springs and more necessary on account of speed to balance the unsprung weight.

According to a modification, and as illustrated in Figure 3, instead of securing the main axle bearings 16 and springs 22 to the side members of the chassis 17, as in Figures 1 and 2, the springs 16a and springs 22 (not shown), may be attached to a sub-frame 29 which will thus carry the road wheels 10, 11, 12 and 13 and their driving and pivoting mechanisms. The sub-frame 29 is pivotally connected to cross members 17a on the main chassis 17 by trunnions, blocks or other devices 30 which are disposed on the longitudinal centre line of the chassis and through the forward one of which passes the cardan or drive shaft 31. The trunnions 30 also allow for side movement when the vehicle is traversing rough country or travelling across an incline.

From the above description it will be appreciated that each road wheel of the vehicle is sprung separately and can move independently in a vertical direction, and that unsprung weight is substantially reduced and eliminated when the reaction springs are fitted. An improved mechanical efficiency is obtained as the rear axles are always kept in the same plane relatively to the engine crank shaft and to the change speed gear under every condition of load. The vehicle will hold the road much better than those provided with ordinary suspension, as one wheel passing over an obstacle does not affect the others; in passing over uneven surface each wheel adapts itself to the contour of the road; the weight of the vehicle on the springs cannot produce a bouncing and rolling effect at speed. A lighter construction of chassis is possible. The wear of tyres is reduced to a minimum. The improved spring suspension is equally adapted to all types of automobiles, from the high powered racing car to the lorry and motor omnibus; with the former, higher speeds will be possible owing to the better road holding qualities and consequent reduction in wheel spin and with the latter greater steadiness and comfort in riding will be realized together with an appreciable reduction in cost of upkeep and repairs.

What I claim is:—

1. A driving and spring suspension for vehicles having four driving road wheels, wheel carrying members mounted for pivotal movement with respect to the vehicle frame, a wheel carried by the free end of each member, a load carrying spring connected with the vehicle frame and cooperating with each pair of driving wheels below the mounting of such wheels in the wheel carrying members, and a reaction spring connected to the frame and to each of the wheel carrying members, said latter connections being in line with the pivotally supported members.

2. A driving and spring suspension for vehicles having four driving road wheels, wheel carrying members mounted for pivotal movement with respect to the vehicle frame, a wheel carried by the free end of each member, a load carrying spring connected with the vehicle frame and cooperating with each pair of driving wheels below the mounting of such wheels in the wheel carrying members, and a reaction spring adjustably connected to the frame and to each of the wheel carrying members, said latter connections being in line with the pivotally supported members.

3. A driving and spring suspension for a vehicle having four driving road wheels, including two driving axles, a common gear box for said axles, a tube extension for each axle, elongated sleeves mounted on the tube extensions, wheel carrying members connected to the sleeves, a wheel mounted in the free end of each member, and load bearing springs connected to the frame of the vehicle and terminally and slidably engaging the free ends of the wheel carrying members below the wheel mounting therein.

4. A driving and spring suspension for a vehicle having four driving road wheels, including two driving axles, a common gear box for said axles, a tube extension for each axle, elongated sleeves mounted on the tube extensions, wheel carrying members connected to the sleeves, a wheel mounted in the free end of each member, load bearing springs connected to the frame of the vehicle and terminally and slidably engaging the free ends of the wheel carrying members below the wheel mounting therein, and reaction springs arranged above said wheel carrying members, one end of each spring being secured to the frame and the other end to a wheel carrying member.

5. A driving and spring suspension for a vehicle having four driving road wheels, including two driving axles, a common gear box for said axles, a tube extension for each axle, elongated sleeves mounted on the tube extensions, wheel carrying members connected to the sleeves, a wheel mounted in the free end of each member, load bearing springs connected to the frame of the vehicle and ternally and slidably engaging the free ends of of the wheel carrying members below said wheel mounting therein, and reaction springs arranged above said wheel carrying members, one end of each spring being adjustably connected to the frame and the other end to a wheel carrying member.

6. A driving and spring suspension for vehicles having four driving road wheels, a wheel-carrying member for each of said road wheels, said wheel-carrying member being constructed in substantially triangular form and mounted for pivotal movement with respect to the vehicle frame, a road wheel carried by the free end of each triangular member, a load-carrying spring having connection with the vehicle frame and cooperating with each pair of driving wheels on the same side of the vehicle, and an adjustable balancing spring connected to the frame and to each of the wheel-carrying members.

7. A driving and spring suspension for a vehicle having four driving wheels, two main driving axles arranged closely together, a differential common to said driving axles, tubular members enclosing the axles, the tubular members extending from the respective sides of the differential to the outer sides of the chassis side members, triangular shaped wheel-carrying members pivotally mounted on the tubular members and carried in bearings in the chassis side members, a road wheel mounted on the free end of each triangular member, and a load-carrying spring connected with the vehicle frame and cooperating with each driving wheel.

8. In a driving and spring suspension for vehicles of the type including a transverse axle drive shaft and a tubular member enclosing said shaft, a road wheel-carrying member constructed in right angled triangular form, one side of the member forming a sleeve to turn about said tube, a bearing for said carrying member, that portion of the wheel-carrying member arranged at right angles to the sleeve forming a housing for road wheel driving connections, the remaining side of the triangular shaped member forming a brace strut.

9. In a driving and spring suspension for vehicles of the type including a transverse axle and a tube enclosing such axle, a road wheel-carrying member constructed in right angled triangular form, one side of said member forming a sleeve mounted on said tube, a chassis supported bearing for the sleeve, that side of the wheel-carrying member arranged at right angles to the sleeve being constructed in the form of a casing to enclose the driving connections to the wheel, the third side of said member providing a brace strut, an arm projected at right angles to the sleeve, and an adjustable balancing means intermediate said arm and the vehicle frame.

In testimony whereof I have hereunto signed my name.

FRANK SMEDLEY FARNSWORTH.